(12) United States Patent
Favagrossa

(10) Patent No.: US 9,802,582 B2
(45) Date of Patent: Oct. 31, 2017

(54) ROTARY BRUSH, FOR MOTOR VEHICLE WASHING SYSTEMS

(71) Applicant: FAVAGROSSA EDOARDO S.R.L., Roncadello di Casalmaggiore (CR) (IT)

(72) Inventor: Leonardo Favagrossa, Roncadello di Casalmaggiore (CR) (IT)

(73) Assignee: FAVAGROSSA EDOARDO S.R.L., Roncadello di Casalmaggiore (IT)

( * ) Notice: Subject to any disclaimer, the term of this patent is extended or adjusted under 35 U.S.C. 154(b) by 0 days.

(21) Appl. No.: 14/917,007

(22) PCT Filed: Feb. 2, 2014

(86) PCT No.: PCT/IB2014/000121
§ 371 (c)(1),
(2) Date: Mar. 5, 2016

(87) PCT Pub. No.: WO2015/033192
PCT Pub. Date: Mar. 12, 2015

(65) Prior Publication Data
US 2016/0193987 A1    Jul. 7, 2016

(30) Foreign Application Priority Data

Sep. 5, 2013   (IT) .............................. MI2013A1457

(51) Int. Cl.
*B60S 3/00*   (2006.01)
*B60S 3/06*   (2006.01)
(Continued)

(52) U.S. Cl.
CPC .................. *B60S 3/06* (2013.01); *A46B 7/10* (2013.01); *A46B 13/003* (2013.01);
(Continued)

(58) Field of Classification Search
CPC ............ A46B 13/005; B60S 3/06; B60S 3/00; B60S 3/04
(Continued)

(56) References Cited

U.S. PATENT DOCUMENTS 4,815,158 A * 3/1989 Crotts .................... B60S 3/066
                                                         15/179
5,160,430 A * 11/1992 Gasser .................. B01D 61/12
                                                        134/109
(Continued)

FOREIGN PATENT DOCUMENTS

JP    2009-046023 A    3/2009
JP    2009-178173 A    8/2009
(Continued)

OTHER PUBLICATIONS

International Search Report dated May 19, 2014.

*Primary Examiner* — Michael Jennings
(74) *Attorney, Agent, or Firm* — Hedman & Costgan, P.C.; James V. Costigan; Kathleen A. Costigan

(57) ABSTRACT

A rotary washing brush assembly for motor vehicle washing systems comprises a plurality of cleaning elements, each of which comprises a plate body applied to a washing brush central shaft; the plate body having a substantially elongated configuration, extending according to a longitudinal axis thereof, and including a plurality of cut-outs defining a plurality of tapering strips having corner portions including either bevelled or non-bevelled corner portions.

15 Claims, 12 Drawing Sheets

(51) Int. Cl.
*A46B 7/10* (2006.01)
*B24D 13/06* (2006.01)
*B24D 13/04* (2006.01)
*B24D 13/10* (2006.01)
*A46B 13/00* (2006.01)
*A46D 1/00* (2006.01)
*B60S 3/04* (2006.01)

(52) U.S. Cl.
CPC .......... *A46B 13/005* (2013.01); *A46D 1/0207* (2013.01); *B24D 13/04* (2013.01); *B24D 13/06* (2013.01); *B24D 13/10* (2013.01); *A46B 2200/3046* (2013.01); *B60S 3/00* (2013.01); *B60S 3/04* (2013.01)

(58) Field of Classification Search
USPC ............................................. 15/97.3, 230.16
See application file for complete search history.

(56) References Cited

U.S. PATENT DOCUMENTS

| | | | | |
|---|---|---|---|---|
| 5,245,771 A * | 9/1993 | Walsh | ..................... | E01H 5/068 172/484 |
| 5,410,770 A * | 5/1995 | Nittoli | ..................... | A46B 3/18 15/230.16 |
| 5,802,654 A * | 9/1998 | Yeaglin | ..................... | B60S 3/00 15/97.3 |
| 5,813,076 A * | 9/1998 | Belanger | ..................... | B60S 3/04 15/230.19 |
| 5,989,356 A * | 11/1999 | Candeletti | ............... | B60S 3/066 134/6 |
| 6,279,190 B1 * | 8/2001 | Belanger | ..................... | A46B 3/16 15/230.16 |
| 6,289,544 B1 * | 9/2001 | Kirikian | ............... | A46B 13/003 15/230.14 |
| 6,564,418 B1 * | 5/2003 | Favagrossa | .......... | A46B 13/001 15/230.16 |
| 7,617,561 B2 * | 11/2009 | Couture | .................. | B60S 3/066 15/306.1 |
| 8,181,303 B2 * | 5/2012 | Vivyan | ................. | A46B 13/003 15/230.14 |
| 8,393,044 B2 * | 3/2013 | Favagrossa | ............. | B60S 3/06 15/230.16 |
| 8,584,295 B1 * | 11/2013 | Yeaglin | ..................... | B60S 3/04 15/53.1 |
| 9,168,898 B2 * | 10/2015 | Yeaglin | ..................... | B60S 3/04 |
| 2002/0174503 A1 * | 11/2002 | Clark | ........................ | B60S 3/06 15/230.16 |
| 2004/0200024 A1 * | 10/2004 | Yamin | ..................... | B60S 3/066 15/230.16 |
| 2005/0268412 A1 * | 12/2005 | Pecora | .................... | B60S 3/063 15/97.3 |
| 2006/0064835 A1 * | 3/2006 | Favagrossa | .......... | A46B 13/005 15/230.16 |
| 2006/0207047 A1 * | 9/2006 | Weyandt | ............. | A46B 13/003 15/230.16 |
| 2008/0078048 A1 * | 4/2008 | Belanger | ............. | A46B 13/005 15/230.16 |
| 2009/0199880 A1 * | 8/2009 | Wentworth | ............... | B60S 3/06 134/123 |
| 2009/0217944 A1 * | 9/2009 | Munera | ..................... | B08B 1/02 134/6 |
| 2009/0250993 A1 | 10/2009 | Vivyan | | |
| 2009/0282630 A1 * | 11/2009 | Reed | ......................... | B60S 3/04 15/97.3 |
| 2009/0282708 A1 * | 11/2009 | Reed | ......................... | B60S 3/04 37/231 |
| 2010/0031459 A1 * | 2/2010 | Holbus | ................ | A46B 13/005 15/97.3 |
| 2010/0058549 A1 | 3/2010 | Favagrossa | | |
| 2013/0104332 A1 * | 5/2013 | Belanger | ............. | A46B 13/001 15/246 |

FOREIGN PATENT DOCUMENTS

| | | |
|---|---|---|
| KR | 100919923 61 | 10/2009 |
| KR | 100993050 B1 | 11/2010 |

* cited by examiner

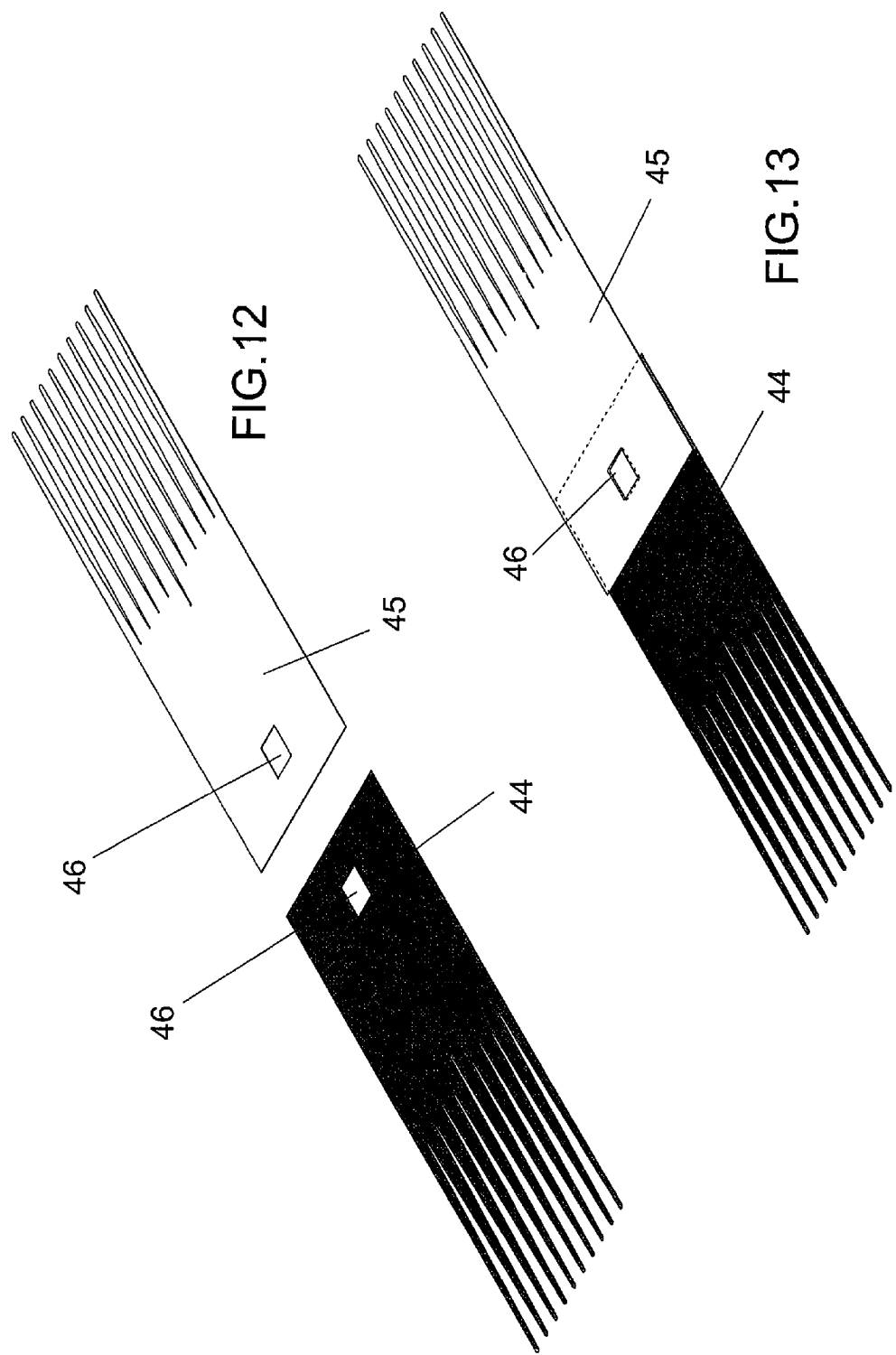

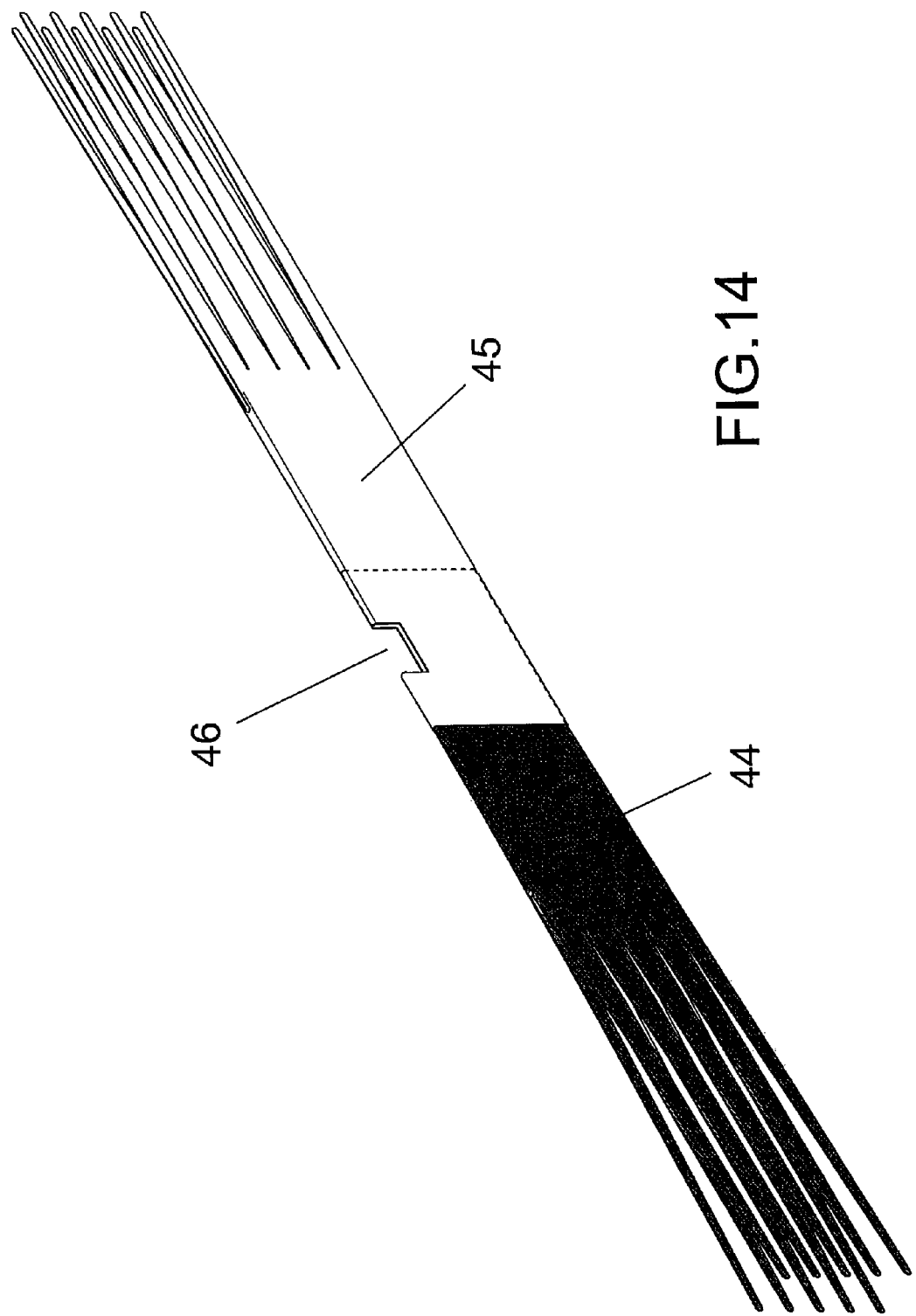

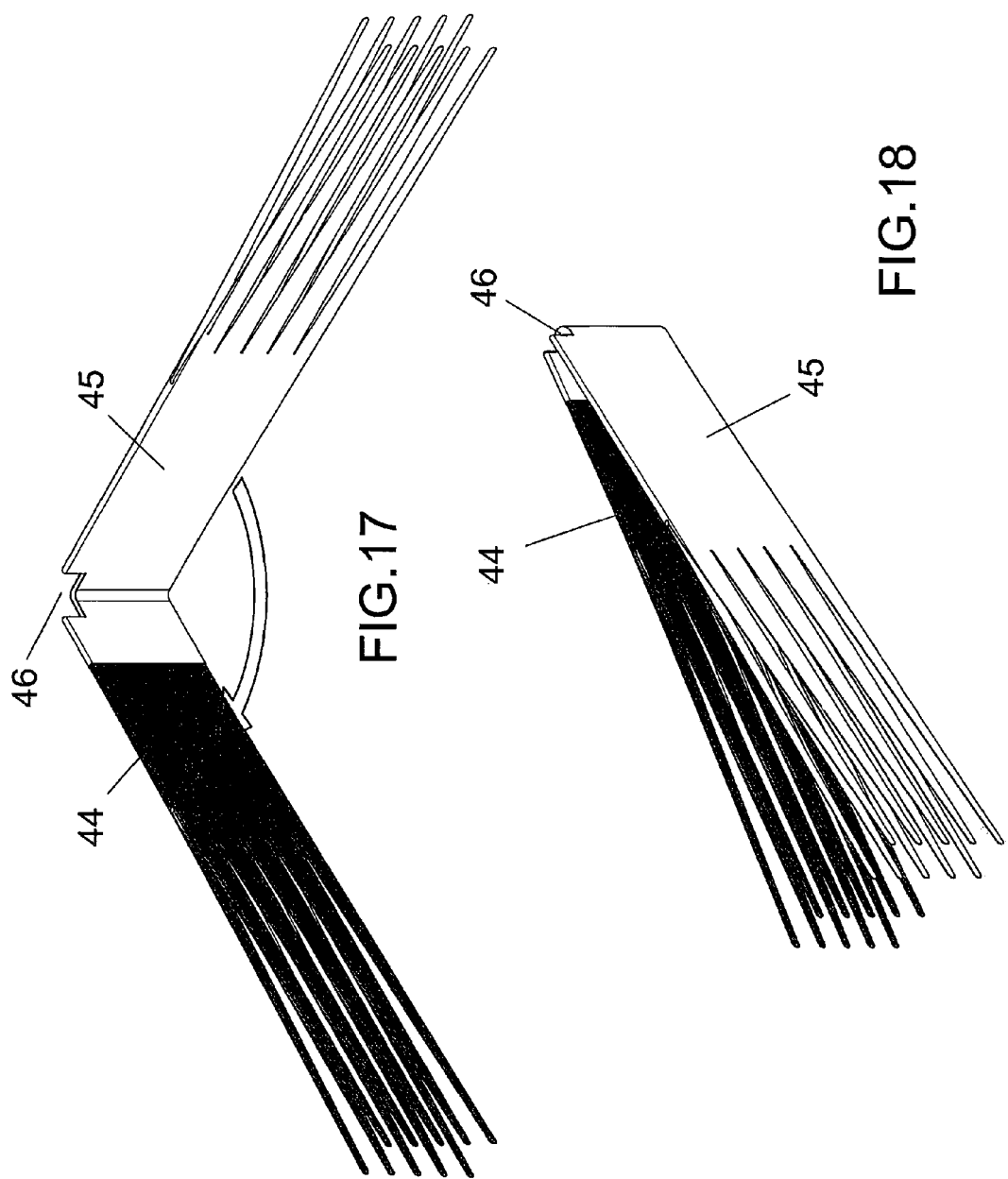

ROTARY BRUSH, FOR MOTOR VEHICLE WASHING SYSTEMS

BACKGROUND OF THE INVENTION

The present invention relates to a rotary brush, for motor vehicle washing systems.

As is known, automatic motor vehicle washing systems conventionally comprise a plurality of rotary washing brush assemblies generally comprising a brush assembly support, usually of a cylindric arrangement, and coupled to a rotary driving member.

On an outer surface of the support are usually applied a plurality of flexible cleaning elements arranged in an adjoining relationship with respect to one another and coupled, at an end portion thereof, to said support, in a perpendicular relationship thereto.

An automatic cleaning and washing, for example, of a motor vehicle body are achieved by causing a plurality of the above mentioned washing brush assemblies to be rotatively driven thereby causing said flexible elements, held in a preset arrangement by centrifugal forces generated by the rotary bush assembly, to impact against the motor vehicle body, through washing water and/or washing water solutions or emulsions.

Prior washing brushes usually comprise a plurality of flaps, or strip and band elements, generally consisting of a felt material, a synthetic material bristle arrangement, synthetic foamed material strings, or a combination of different cleaning materials.

The document US 2010/058549 A1 discloses substantially the preamble of claim 1.

SUMMARY OF THE INVENTION

The aim of the present invention is to provide such an improved washing rotary brush assembly including tapering fringes thereof, to provide at the end portions of the band elements a weight much lower than that of prior washing brush assemblies.

Within the scope of the above mentioned aim, a main object of the invention is to provide such an improved washing brush assembly with a softer and more delicate contacting touch, thereby preventing the motor vehicle body from being damaged, while applying a very high washing force on any surfaces to be washed, and moreover reducing the noise generated during the overall motor vehicle washing operation.

Another object of the present invention is to provide such a washing brush assembly having a good aesthetic design and which may be also used in a plurality of different operating arrangements depending on the user requirements.

Yet another object of the present invention is to provide such a motor vehicle washing brush assembly which, owing to its specifically designed operating features, is very reliable and safe in operation.

According to one aspect of the present invention, the above mentioned aim and objects, as well as yet other objects, which will become more apparent hereinafter, are achieved by a rotary washing brush assembly, for motor vehicle washing systems, according to claim 1.

BRIEF DESCRIPTION OF THE DRAWINGS

Further characteristics and advantages of the present invention will become more apparent hereinafter from the following detailed disclosure of a preferred, though not exclusive, embodiment of the invention which is illustrated, by way of an indicative but not limitative example, in the accompanying drawings, where:

FIG. 12 shows the half-bands or half-flags shown in a disassembled condition;

FIG. 13 shows the half-flags in a partially overlapping relationship, so arranged that also their holes are mutually overlapped;

FIG. 14 shows the two half-flags bent through a 90° angle, thereby a half-flag encompasses an end portion of the other one;

FIGS. 17 and 18 show the two half-flags suitably associated with one another and including a plurality of corresponding holes being aligned in a bending operation according to a cross direction with respect to their longitudinal extension;

FIG. 18, in particular, is a detailed view showing the two die-cut flag elements so arranged as to be associated with one another and engaged at a block in a plastic material shaft, said block being clamped as to provide small structural reinforcement cups at the bottom portion of collet forming bristles.

DESCRIPTION OF THE PREFERRED EMBODIMENTS

Figure 1:
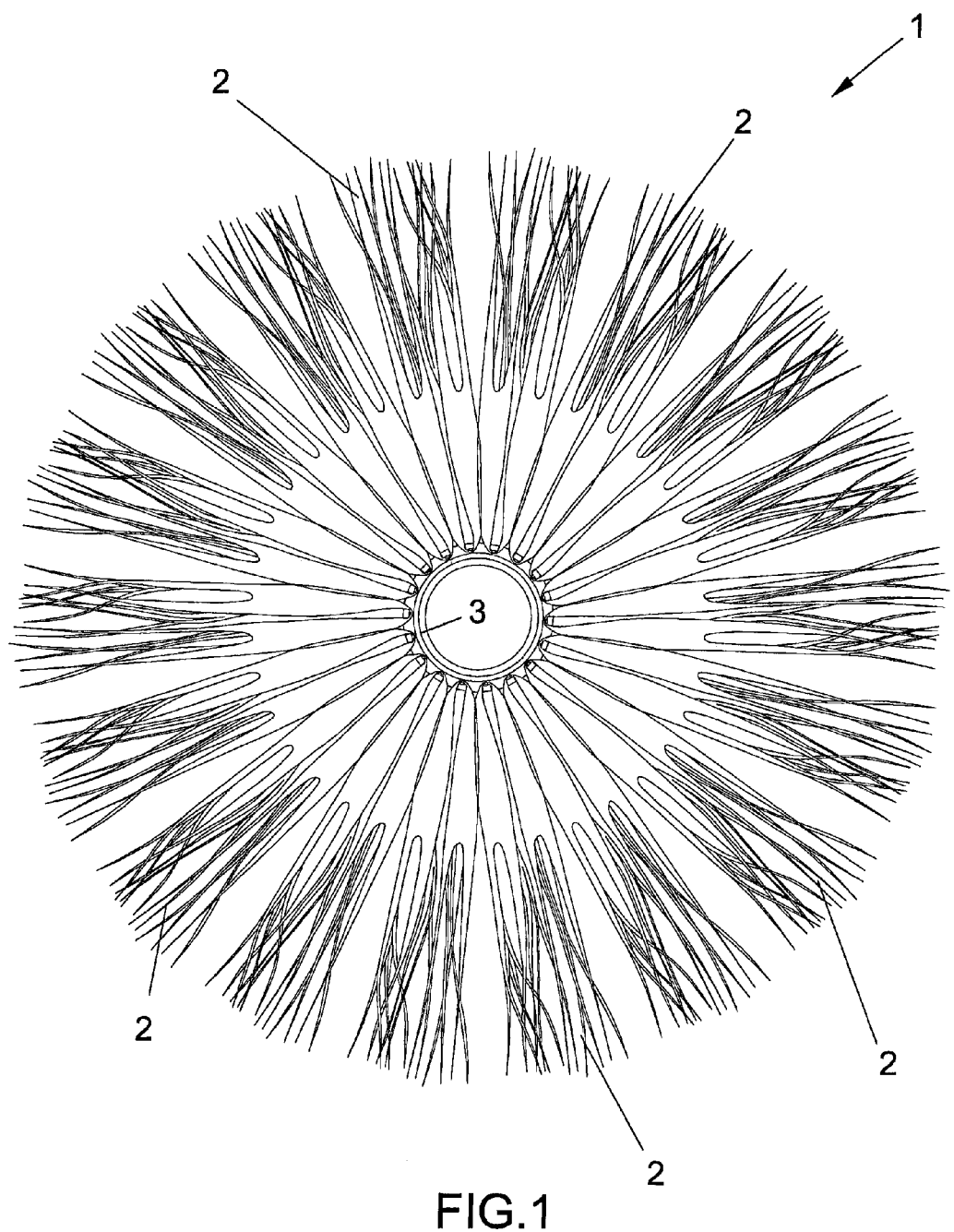
FIG. 1 is a front elevation view of an improved motor vehicle washing brush assembly according to the present invention.
Figure 2:
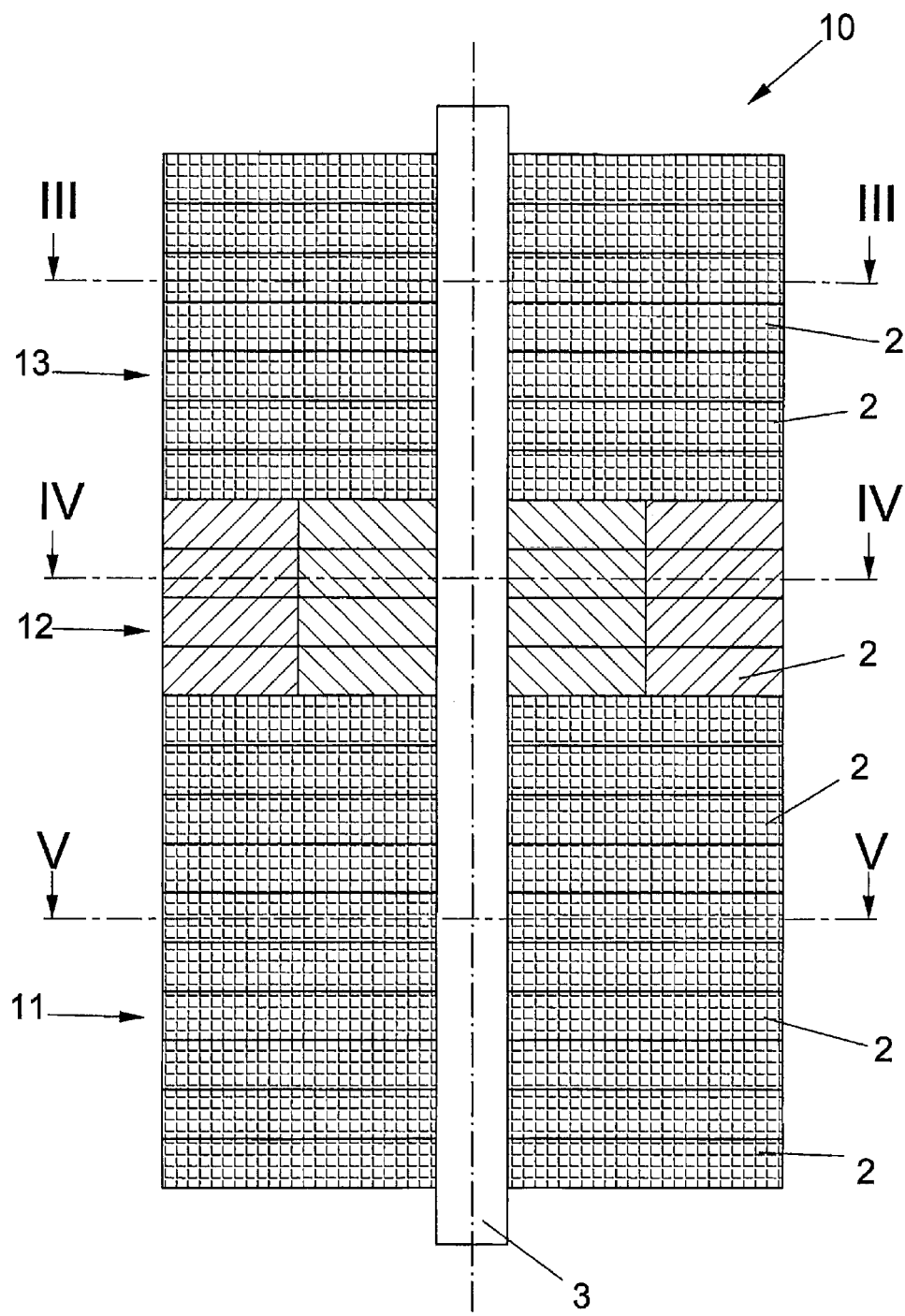
FIG. 2 is a cross-sectioned side view of a washing brush assembly battery or bank, including a plurality of washing brush assemblies having a vertical shaft configuration, according to the present invention.
Figure 3:
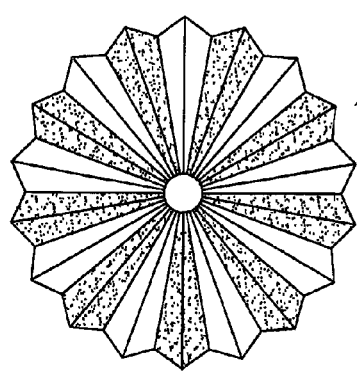
FIG. 3 is a further cross-sectioned front view taken along the section plane III of FIG. 2.
Figure 4:
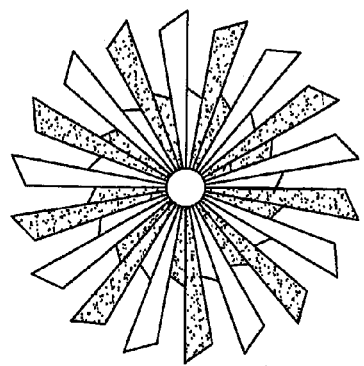
FIG. 4 is a further cross-sectioned front view taken along the section plane IV of FIG. 2.
Figure 5:
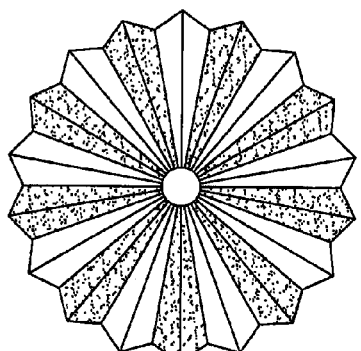
FIG. 5 is yet another cross-sectioned front view taken along the section plane V of FIG. 2.

With reference to the number references of the above mentioned figures, the improved rotary washing brush assembly according to the present invention, generally indicated by the reference number 1, comprises a plurality of cleaning elements 2, each of which consists of a rectangular plate-like body applied to a washing assembly central shaft 3.

More specifically, the plate body 2 may be advantageously made of a closed cell or non-closed cell foamed plastic material, or a felt, fabric or any other suitable materials.

Preferably, the plate body is made of a foamed polyethylene or EVA material, or other closed cell or non-closed cell foamed flexible material, or a fabric or non-woven material, or any desired combinations of coupled or non-coupled materials.

The plate body 2 has a substantially elongated rectangular configuration, extending along a longitudinal axis of said band, and comprises a plurality of longitudinal cut-outs 5 defining and separating from one another a plurality of substantially tapering strips 4 having a triangular configuration or a nearly triangular configuration with either bevelled or non-bevelled corner portions.

Figure 9:
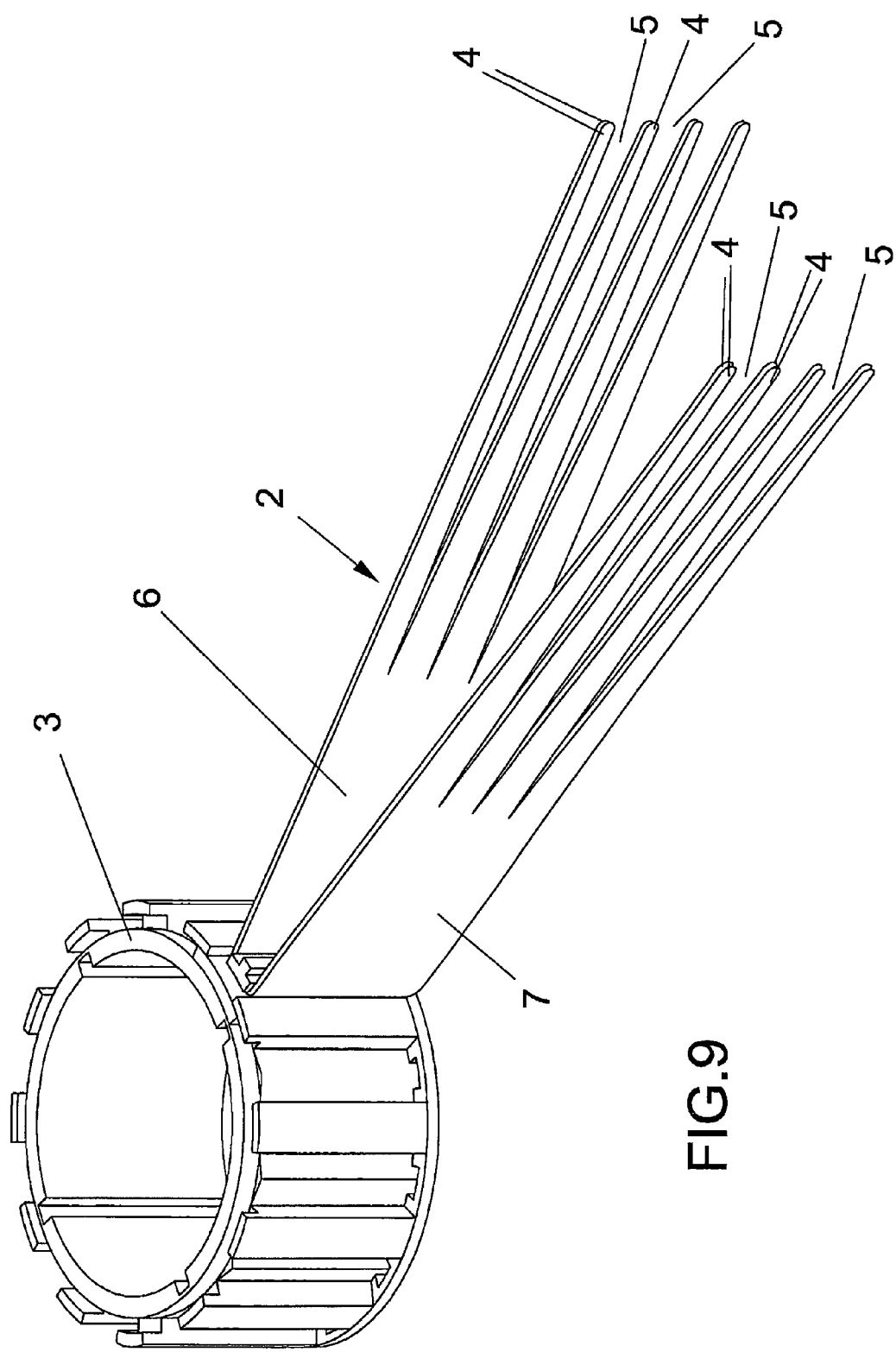
FIG. 9 is a perspective view showing a connection of a band to a central core element.
Figure 10:
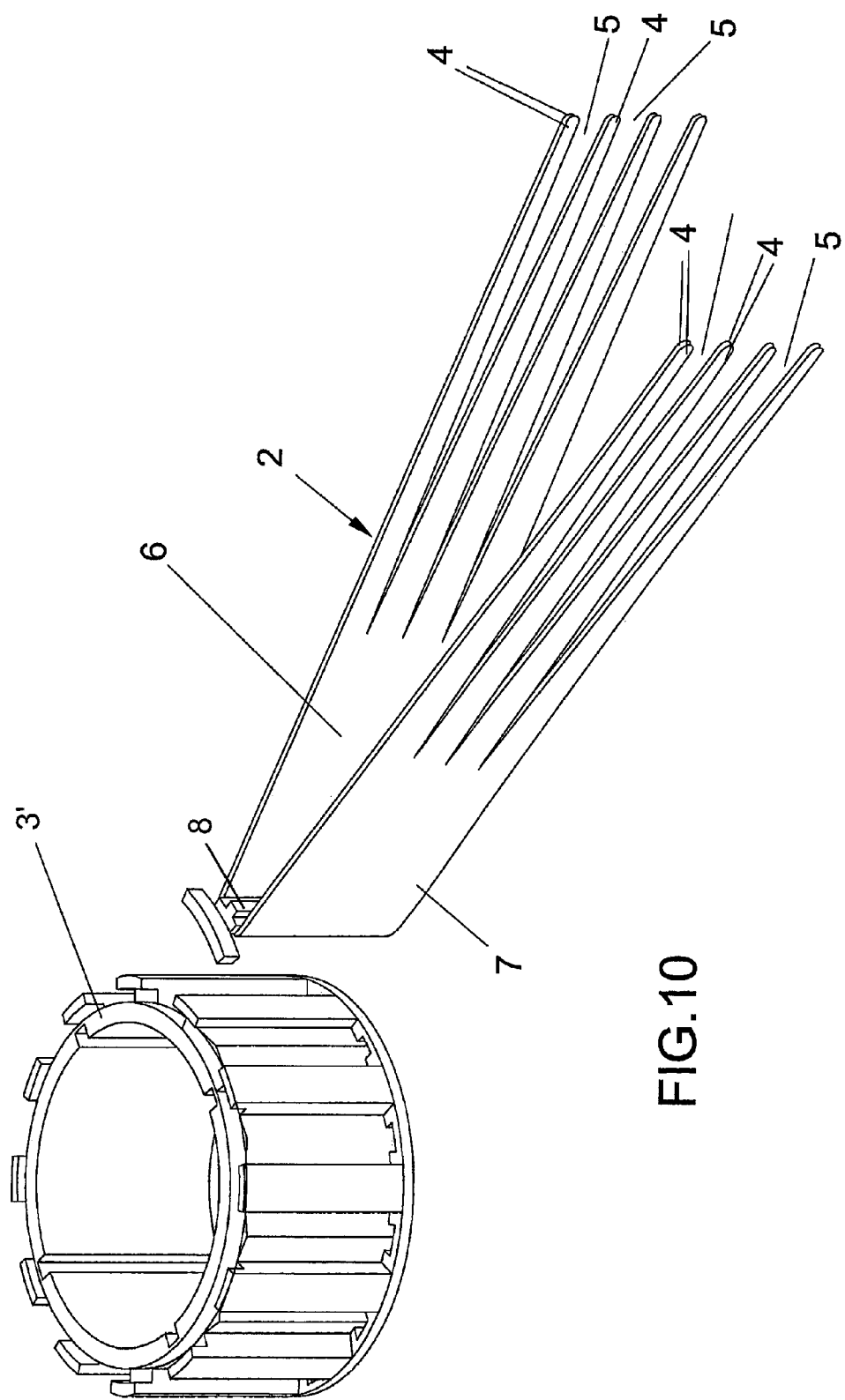
FIG. 10 is a view similar to FIG. 9, in an exploded arrangement thereof.
Figure 11:
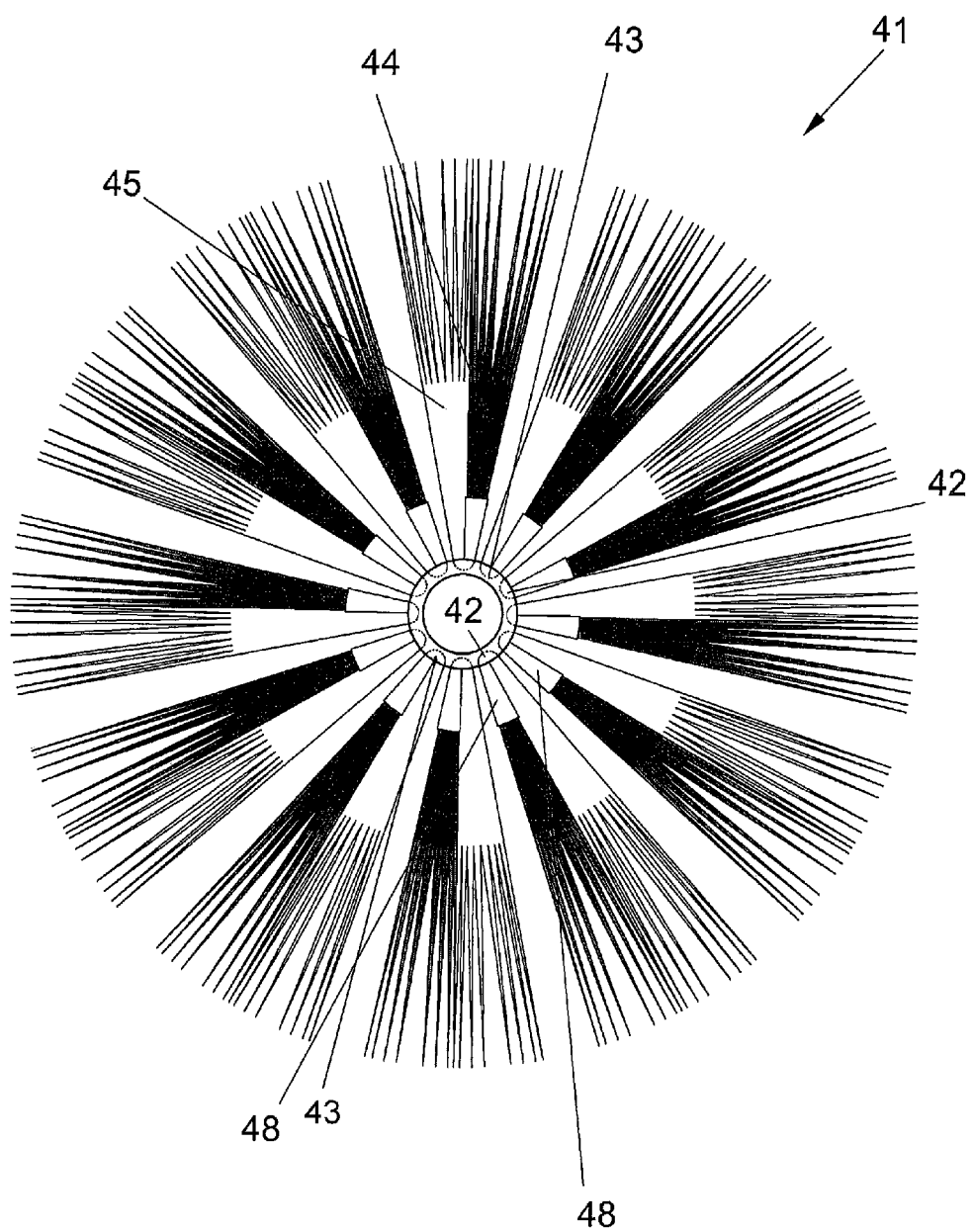
FIG. 11 shows a washing brush assembly including tapered bristles providing a collet arrangement and with middle bands adapted to be crossed thereby providing a high strength cup element, the washing brush assembly having a construction formed by flag or band elements crossed at the bottom of the brush system.

The plate body 2 may be bent through 180° about its cross axis to provide two sectors, indicated by the reference numbers 6 and 7 in FIGS. 9 and 10, thereby being arranged in a mutually adjoining relationship, in their use condition, wherein the cleaning element plate body 2 is applied to a central shaft 3 of a washing brush assembly.

Alternatively, the plate body 2 may be bent at first on itself, along its longitudinal axis, and then through an angle of 180°, about its cross axis, to provide two cup sectors arranged in a mutually adjoining relationship, in their use condition, in which the cleaning element is applied to a central shaft of a washing brush assembly.

The plate body may be also be bent just with a bending angle of about 180°.

Figure 8:
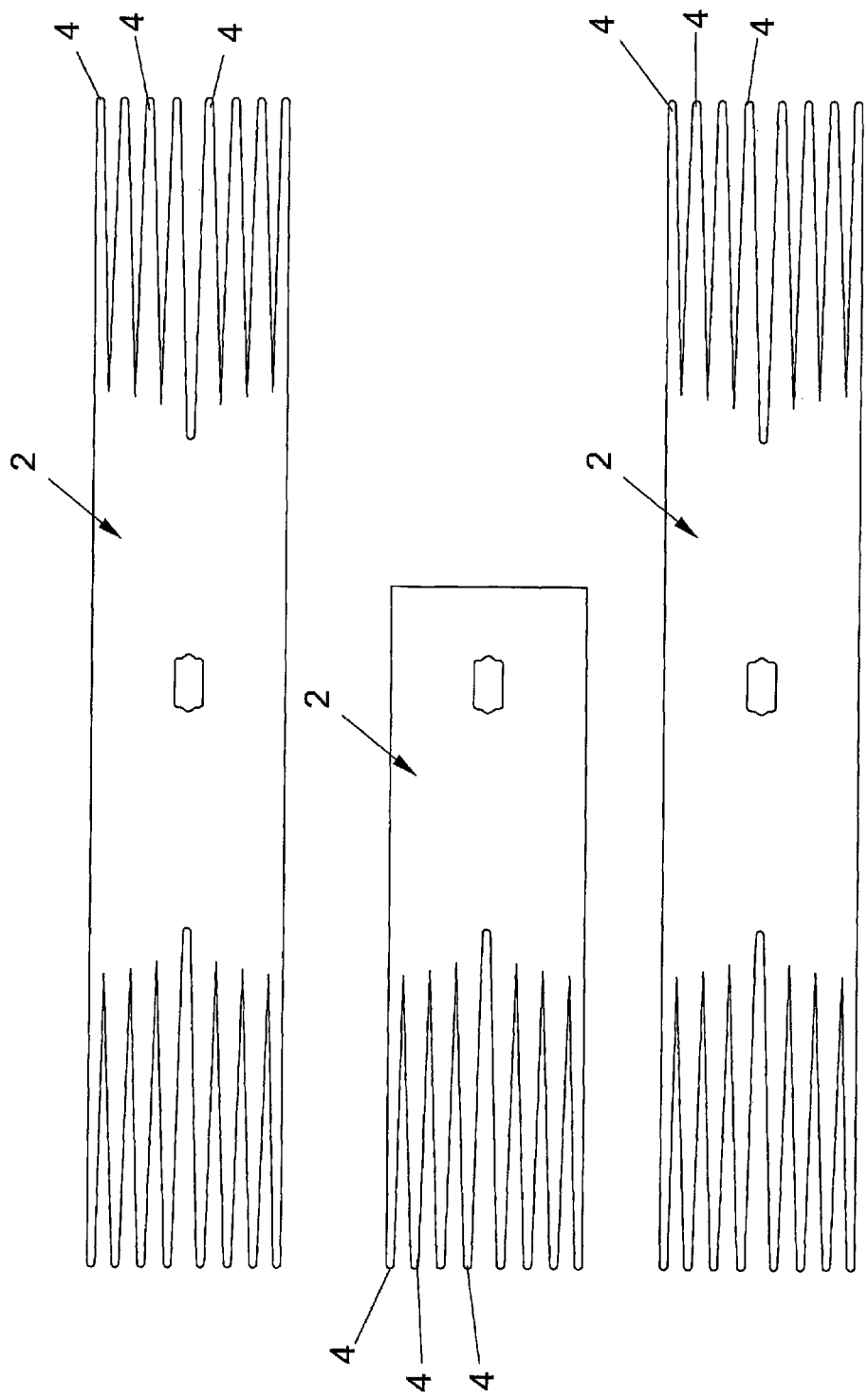
FIG. 8 shows a second series of three bands.

In the central cleaning element shown in FIG. 8, one of the sectors does not comprise any strip 5.

According to the present invention, the washing brush assembly has a configuration depending on the intended application thereof.

In the illustrative embodiment shown in FIGS. 2-5, a vertical-shaft arrangement washing brush assembly battery 10 preferably comprises three main sectors: a bottom sector 11, a central or middle sector 12 and a top sector 13.

Figure 7:
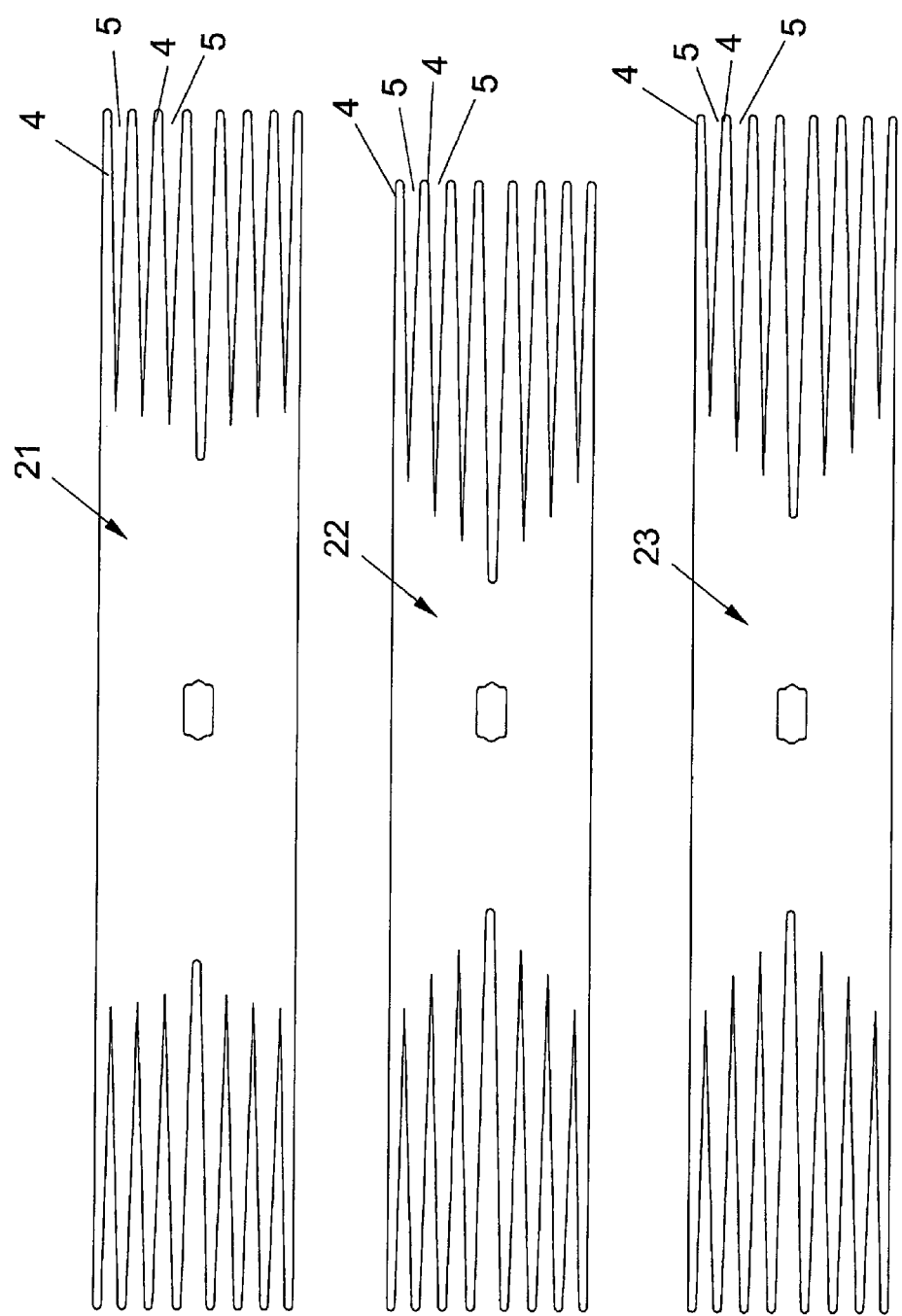
FIG. 7 shows a first series of three bands.

The bottom sector 11 is designed for providing a stronger washing effect and, in this illustrative embodiment, said bottom sector 11 comprises ten washing brush assemblies consisting of eighteen band elements of a type indicated by the reference number 21 in FIG. 7, which comprise a plurality of strips 4 having substantially the same length.

The central or middle sector 12 provides a delicate washing and comprises, in this illustrative embodiment, four washing brush assemblies consisting of twelve bands of a type indicated by the reference number 22 in FIG. 7, which comprise strips 4 having a small length or being arranged in an offset position from one another.

The top sector 13 provides a middle force washing operation and comprises, in this illustrative embodiment, seven washing brush assemblies consisting of twelve bands of a type indicated by the reference number 23 in FIG. 7, which in turn comprise a plurality of strips 4 having different lengths.

Figure 6:
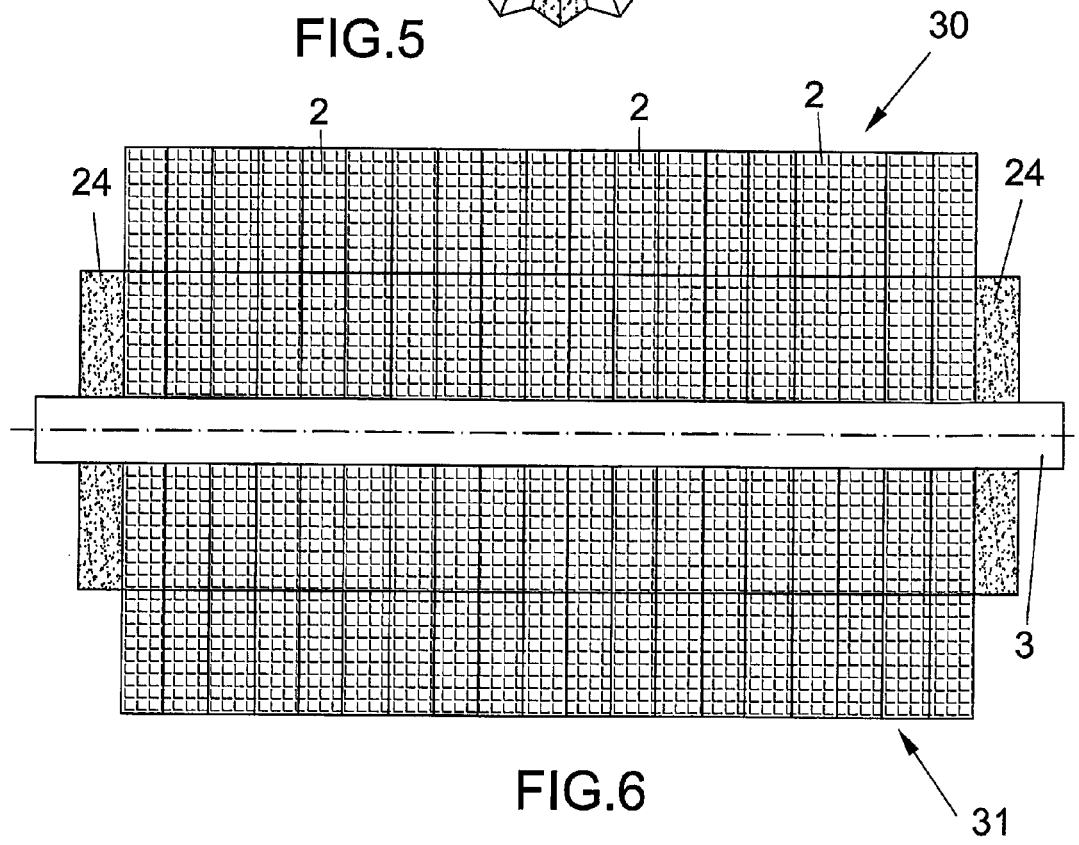
FIG. 6 is yet another cross-sectioned side view of a battery of washing brush assemblies having a substantially horizontal shaft configuration according to the present invention.

In the illustrative embodiment shown in FIG. 6, a horizontal shaft arrangement washing brush battery, generally indicated by the reference number 30, comprises a single central or middle body 31 closed, at the opposite sides thereof, by two hand-cut through bands 24.

The central or middle body 31 provides a delicate washing operation and comprises, in this example, nineteen washing brush assemblies, formed by twelve bands of the type shown in FIG. 8, comprising strips 4 having a small length or being arranged in an offset position from one another.

The washing brush assembly, moreover, comprises a central shaft 3, thereto are applied a plurality of plastic material elements 3' supported by said central shaft 3 and including a plurality of insert elements 8 holding the bent flaps 6 and 7 of the plate body 2 bent through a 180° angle about its cross axis to provide two sectors 6 and 7, which are bent one onto the other about the longitudinal axis and then through an angle of 180° about their cross axis.

This washing brush assembly is made starting from half-flags, overlapped onto one another thereby providing an inner structural rib inside the washing brush assembly, improving the strength and stiffness of the assembly both in operation and in a rest condition.

The flag elements thus arranged are located in a plastic material stub shaft element and are clamped by thermowelded plugs, thereby allowing to quickly and easily make a plurality of washing brush assemblies having different diameters, each including a reinforcement collet.

More specifically, the collet or collar at the bottom of the bristles provides the cup with an increased strength, in association with a high fringe softness, thereby the driving current of the brush assembly operating electric motors may be properly adjusted while preventing possible damages to the motor vehicle bodies.

Moreover, the enhanced central stiffness of the washing brush assemblies provides each brush assembly with an enhanced washing force, since said brush assemblies are always held in a straight and "inflated" condition, while also facilitating their packaging and shipment operations.

FIGS. 11 to 18 show a rotary washing brush assembly 41, consisting of two die-cut half-flag elements 44 and 45, having a like size and shape, so overlapped as to also overlap their clamping or affixing holes 46.

Figure 15:
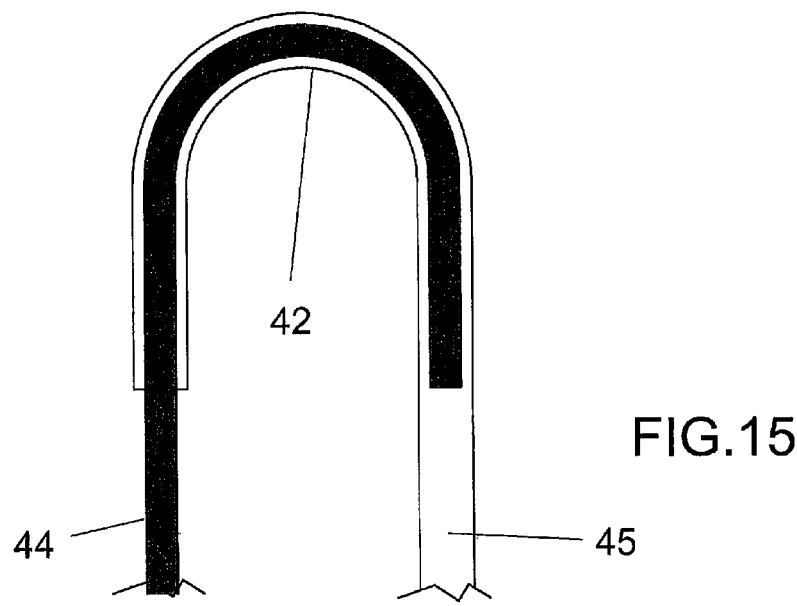
FIG. 15 shows two half-flags so coupled to one another as to cause one said half-flag to be overlapped on the other one, while encompassing the end portion of the first one.
Figure 16:
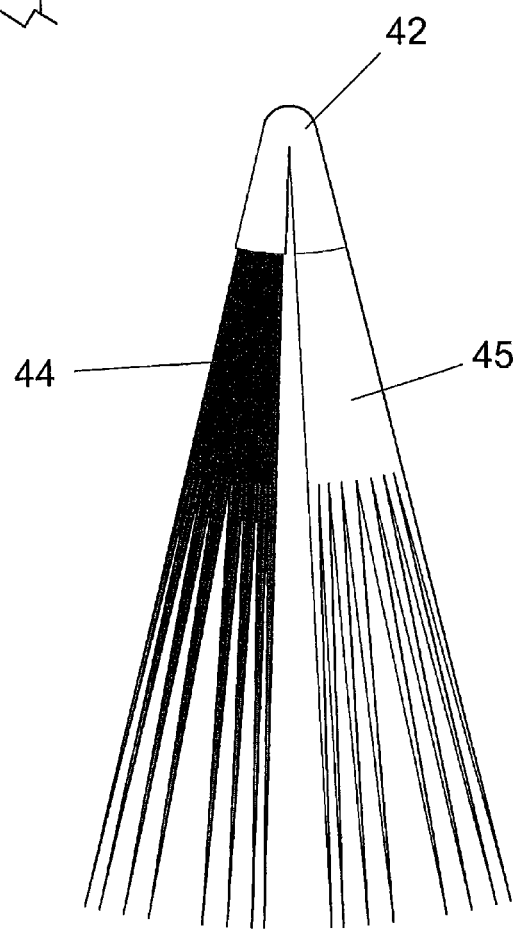
FIG. 16 shows the half-flags of FIG. 2 so bent that one of the two half-flags partially covers an end portion of the other one.

More specifically, said half-flags 44 and 45 are both bent in half through a 90° angle along their longitudinal axis (FIG. 14) and are then further bent through 90° along a cross axis passing through the clamping holes (see FIGS. 15 and 16).

The block 43 of flags 44 and 45 thus made is engaged in the plastic material shaft 42, the flag block 43 being then easily and quickly fixed as an operating unit.

Thus, small cup structural reinforcement elements 48 are provided at the bottom of the bristles, which cup elements may be referred to and operate as reinforcement collets.

The inventive washing brush assembly 41 may be made starting from mutually overlapped half-flags 44 and 45 to provide a brush assembly inner structural rib, improving the strength of the overall brush assembly both in operating and rest conditions.

The flags 44 and 45 thus made are applied to said plastic material shaft 42 and are clamped to the latter through suitable thermowelded clamping plugs.

Thus, the washing brush assembly 41 is always held in an inflated and straight condition, providing an improved washing orientation and good aesthetic features.

In actual practice, said half-flags 44 and 45 allow to quickly and easily make a number of washing brush assemblies 41 having different diameters, each including reinforcement collet 48 arrangements.

More specifically, the collet element 48 at the base or bottom of the washing brush bristles improves the cup strength, while providing very soft fringes, which in turn allows to perfectly adjust the currents of the electric motors driving the washing brush assemblies, while preventing the washing brush assemblies 41 from damaging the motor vehicle body.

Furthermore, the improved central stiffness of each individual washing brush assembly 41 increases the washing force by always holding, as stated, the washing brush assemblies 41 in a straight and inflated condition, while facilitating their packaging and shipment arrangement.

It has been found that the invention fully achieves the intended aim and objects.

In fact, the inventive rotary brush assembly 41 provides a very delicate washing operation and a softer touch protecting the motor vehicle body against possible scratches and damages, while holding unaltered a high washing force.

The present invention, contrary to prior washing brush assemblies, besides providing a tip washing operation, also operates by the central bodies of the fringes, thus providing an extended contact surface and, accordingly, an improved quick washing operation, which in turn allows to save water and power.

Moreover, prior washing brush assemblies operating in a tip contact mode of operation, that is essentially arranged in a plane, during the washing operation tend to open and deform as they contact the motor vehicle bodies, which in the present invention does not occur owing to the three-dimensional arrangement of the washing bands including their corresponding reinforcement cups and firmly joined to the shaft 42.

Moreover, the washing brush assembly 41 according to the present invention allows to easily and quickly make customized washing brush batteries, according to any user requirements.

In practicing the invention, the used materials and size may be any, depending on requirements.

The invention claimed is:

1. A rotary washing brush assembly for motor vehicle washing systems, said washing brush assembly comprising a plurality of band cleaning elements, each of which comprises a plate body applied to a central washing brush shaft; each said plate body having a substantially elongated rectangular configuration, extending according to a longitudinal axis thereof, and including a plurality of cut-outs, characterized in that said cut-outs are longitudinal cuts and define, at an operating washing end portion of each of said band cleaning element, a plurality of tapering unbent flat strips, said strips being substantially triangular and having either beveled or non-beveled corner portions, thereby said operating wash end portions of each band cleaning element softly contacts without damaging a motor vehicle body, while providing a strong washing force and reducing a washing noise of the washing brush assembly, said washing brush assembly comprising a washing brush assembly battery including a plurality of washing brush assemblies arranged on a vertical axis and including three main sectors: a bottom sector, a central sector and a top sector, said bottom sector providing a strong washing force and comprising a plurality of said washing brush assemblies each of which comprises a plurality of band elements encompassing a plurality of said tapering unbent flat strips having a substantially like length; said central sector providing a delicate washing operation and comprising a plurality of said washing brush assemblies each of which comprises a plurality of band elements including short strips or being arranged in an offset position, said top sector providing a middle force washing operation and including a plurality of said washing brush assemblies each of which comprises a plurality of said band elements including different length strips.

2. A washing brush assembly, according to claim 1, characterized in that the central sector does not comprise said strips.

3. A washing brush assembly, according to claim 1, characterized in that the bottom sector provides an enhanced washing force and comprises a plurality of washing brush assemblies including eighteen said bands, with corresponding strips having a substantially equal length.

4. A washing brush assembly, according to claim 1, characterized in that said central sector provides a delicate washing force and comprises a plurality of washing brush assemblies including twelve bands, comprising corresponding shaft strips having a small length and being arranged in an offset position.

5. A washing brush assembly, according to claim 1, characterized in that said top sector provides a middle washing force and comprises a plurality of washing brush assemblies including twelve bands with a plurality of different length strips.

6. A washing brush assembly, according to claim 1, characterized in that said washing brush assembly comprises a central shaft thereto are applied plastics material elements supported by said central shaft and including a plurality of inserts holding bent flaps of said plate body which is bent through 180° about a cross axis thereof to provide two sectors.

7. A washing brush assembly, according to claim 1, characterized in that said each said cleaning band element comprises both a tip washing portion and a central washing portion, said washing portions providing an enhanced contact surface with said motor vehicle body.

8. A rotary washing brush assembly for motor vehicle washing systems, said washing brush assembly comprising a plurality of band cleaning elements, each of which comprises a plate body applied to a central washing brush shaft; each said plate body having a substantially elongated rectangular configuration, extending according to a longitudinal axis thereof, and including a plurality of cut-outs, characterized in that said cut-outs are longitudinal cuts and define, at an operating washing end portion of each of said band cleaning element, a plurality of tapering unbent flat strips, said strips being substantially triangular and having either beveled or non-beveled corner portions, thereby said operating wash end portions of each band cleaning element softly contacts without damaging a motor vehicle body, while providing a strong washing force and reducing a washing noise of the washing brush assembly, said washing brush assembly comprising a brush wash assembly battery the washing brush assemblies of which are arranged on a horizontal axis and divided into a single central body, closed, at the side portions thereof, by two cut-through band elements, said central body providing a delicate washing and including a plurality of said washing brush assemblies, each of which comprises a plurality of said band elements, including short strips or strips being arranged in an offset position.

9. A rotary washing brush assembly for motor vehicle washing systems, said washing brush assembly comprising a plurality of band cleaning elements, each of which comprises a plate body applied to a central washing brush shaft; each said plate body having a substantially elongated rectangular configuration, extending according to a longitudinal axis thereof, and including a plurality of cut-outs, characterized in that said cut-outs are longitudinal cuts and define, at an operating washing end portion of each said band cleaning element, a plurality of tapering unbent flat strips, said strips being substantially triangular and having either beveled or non-beveled corner portions, thereby said operating wash end portions of each band cleaning element softly contacts without damaging a motor vehicle body, while providing a strong washing force and reducing a washing noise of the washing brush assembly, said washing brush assembly comprising a construction made of half-flag elements having flags that are overlapped onto one another thereby providing an inner structural rib of said washing brush assembly providing an enhanced strength and stiffness both in an operating and in a rest condition of said washing brush assembly.

10. A washing brush assembly, according to claim 9, characterized in that said half-flag elements are arranged in a plastics material shaft and are clamped by clamping thermo welded plug elements.

11. A washing brush assembly, according to claim 9, characterized in that said washing brush assembly comprises two die-cut half-flags having a like size and shape, so overlapped as to cause corresponding clamping holes thereof to also overlap.

12. A washing brush assembly, according to claim 9, characterized in that said half-flags are both bent in half through 90° along a longitudinal axis thereof and are then further bent through 90° along a cross axis thereof passing through said clamping holes.

13. A washing brush assembly, according to claim 9, characterized in that said flags define a flag block to be arranged on a corresponding shaft and that said block is clamped to a support post, thereby providing structural cup elements for reinforcing the bristle bottom.

14. A washing brush assembly, according to claim 9, characterized in that said washing brush assembly is made by mutually overlapped half-flags providing a structural rib within said washing brush assembly to enhance the strength and stiffness of said brush assembly both in an operating and in a rest condition thereof.

15. A washing brush assembly, according to claim 9, characterized in that said flags are partially engaged in a plastics material shaft thereto they are clamped by clamping thermo welded plugs.

* * * * *